United States Patent
Mancosu et al.

(10) Patent No.: US 6,478,991 B1
(45) Date of Patent: Nov. 12, 2002

(54) METHOD FOR VULCANIZING A TIRE BY PREDETERMINING ITS DEGREE OF VULCANIZATION

(75) Inventors: Federico Mancosu, Milan (IT); Giovanni Daminelli, Sesto San Giovanni (IT); Eduardo Goncalves Pinheiro, Sao Paulo (BR)

(73) Assignee: Pirelli Pneumatici S.p.A., Milan (IT)

( * ) Notice: Subject to any disclaimer, the term of this patent is extended or adjusted under 35 U.S.C. 154(b) by 305 days.

(21) Appl. No.: 09/617,143

(22) Filed: Jul. 14, 2000

Related U.S. Application Data
(60) Provisional application No. 60/151,360, filed on Aug. 30, 1999.

(30) Foreign Application Priority Data
Jul. 14, 1999 (EP) .............................. 99830447

(51) Int. Cl.$^7$ .............................. B29C 35/02
(52) U.S. Cl. .............. 264/40.1; 264/40.6; 264/326; 364/475.04
(58) Field of Search .............. 264/40.1, 40.6, 264/315, 326, 475.03, 475.04; 425/143, 162, 169, 170

(56) References Cited

U.S. PATENT DOCUMENTS

| | | | |
|---|---|---|---|
| 3,980,743 A | | 9/1976 | Smith |
| 4,371,483 A | | 2/1983 | Mattson |
| 5,055,245 A | | 10/1991 | Hisatomi et al. |
| 5,680,315 A | * | 10/1997 | Rimondi et al. ........ 364/475.03 |
| 5,784,283 A | * | 7/1998 | Rimondi et al. ........ 364/475.03 |

FOREIGN PATENT DOCUMENTS

| EP | 0 063824 | 11/1982 |
|---|---|---|
| EP | 0 733 456 | 9/1996 |
| FR | 2 134 495 | 12/1972 |

OTHER PUBLICATIONS

Dinges, U. et al., "Computer-unterstützte Optimierung des Vulkanisationsprozesses", Kautschuk und Gummi—Kunststoffe, vol. 46, No. 10, pp. 805–811 (1993).

Porotskii V.G., et al, "Modeling and Automation of Vulcanisation Processes in Tyre Production", International Polymer Science and Technology, vol. 22, No. 6, pp. T/46–T/49, (1995).

Yosuke, M., "Control of Rubber Vulcanizing Process", Patent Abstracts of Japan, vol.009, No. 067, of JP 59199234 (1984).

* cited by examiner

Primary Examiner—Mathieu D. Vargot
(74) Attorney, Agent, or Firm—Finnegan, Henderson, Farabow, Garrett & Dunner, LLP

(57) ABSTRACT

Method for vulcanizing a tire by predetermining a degree of vulcanization, comprising the steps of determining specified structural and dimensional parameters of the tire and of a vulcanization mould, determining the change over a time (t) of specified thermodynamic parameters of the tire, of the mould, of heat-supply fluids and of a cooling fluid, determining a parameter consisting of an equivalent vulcanization time $t_o$, and determining an equivalent degree of vulcanization $X(t_o)$ at specified points within the tire by means of an equivalent isothermal rheometric curve at a reference temperature $T_0$, comprising three consecutive sections having the following equations:

$$X(t_o) = \begin{cases} \dfrac{kt_o^n}{1+kt_o^n} \\ \dfrac{k_x t_o^{n_x}}{1+k_x t_o^{n_x}} + f(t_o - t_{xx}) \\ 1 - C\dfrac{k_R(t_o - t_{100})^{n_R}}{1+k_R(t_o - t_{100})^{n_R}} \end{cases}$$

7 Claims, 8 Drawing Sheets

— torque (FEA)
--- torque (MDR)
— Temperature profile

METHOD FOR VULCANIZING A TIRE BY PREDETERMINING ITS DEGREE OF VULCANIZATION

This application is based on European Patent Application No. 99830447.1 filed on Jul. 14,1999 and U.S. Provisional Application No. 60/151,360 filed on Aug. 30, 1999, the content of which is incorporated hereinto by reference.

The present invention relates to a method for vulcanizing a tire by predetermining its degree (level) of vulcanization.

In the field of tire production, models of vulcanization kinetics have been developed in order to improve the vulcanization cycles. A history of the temperature of the vulcanization cycle is generally used in the attempt to improve the vulcanization according to the model. These models, however, have proved to be either complicated or of low reliability.

The object of the present invention is to avoid the problems and overcome the limitations of the known methods.

In one aspect, the invention relates to a method for vulcanizing a tire by predetermining the change of its state of vulcanization in time by means of a parameter consisting of its degree of vulcanization, the said tire comprising specified vulcanizable mixtures and specified fabrics, the said vulcanization being carried out by means of a vulcanization mould heated by heat-supply fluids and by subjecting the said tire to cooling by means of a specified cooling fluid, the said method comprising the steps of:

a) determining specified structural and dimensional parameters (geometry) of the said tire and the said mould, b) determining the change over a time t of specified thermodynamic parameters, comprising the temperature $T(t)$ and diffusivity $\alpha$ of the said tire, mould, heat-supply fluid and cooling fluid, c) determining a parameter consisting of an equivalent vulcanization time $t_0$ which, at a specified constant reference temperature $T_0$, makes it possible to obtain an equivalent degree of vulcanization $X(t_0)$ equal to the degree of vulcanization $X(t)$ obtained at a specified instant t and at a specified temperature $T(t)$ variable in time, the said equivalent vulcanization time $t_0$ being obtained by means of a specified function of the said reference temperature $T_0$, of the said temperature $T(t)$ and of the said time t, d) determining the said equivalent degree of vulcanization $X(t_0)$ at specified points within the said tire when the said equivalent vulcanization time $t_0$ varies, the said degree of vulcanization $X(t_0)$ being obtained by means of an equivalent isothermal rheometric curve, at the said reference temperature $T_0$, comprising three consecutive sections having the following equations:

$$X(t_o) = \begin{cases} \dfrac{kt_o^n}{1+kt_o^n} \\ \dfrac{k_x t_o^{n_x}}{1+k_x t_o^{n_x}} + f(t_o - t_{xx}) \\ 1 - C\dfrac{k_R(t_o - t_{100})^{n_R}}{1+k_R(t_o - t_{100})^{n_R}} \end{cases}$$

where the aforesaid first equation is valid for a $t_0$ less than or equal to a first specified equivalent time value ($t_0 \leq t_{60}$) at which there is a first specified equivalent degree of vulcanization ($X(t_{60})=60\%$), the aforesaid third equation is valid for a $t_0$ greater than or equal to a second specified equivalent time value ($t_0 \geq t_{100}$) at which there is a second specified value of the equivalent degree of vulcanization ($X(t_{100})=100\%$ or 1), and the aforesaid second equation is valid for a $t_0$ lying between the said first and second values of the said equivalent time ($t_{60} \leq t_0 \leq t_{100}$), where $t_{xx}$ is a third specified equivalent time value, intermediate between the said first ($t_{60}$) and second ($t_{100}$) equivalent time value, at which there is a third specified value of the equivalent degree of vulcanization ($X(t_{xx})=90\%$), where $f(t_0-t_{xx})$ is a cubic interpolation function which, for a $t_0$ less than or equal to the said third equivalent time value ($t_0 \leq t_{xx}$), is equal to 0, while, for a $t_0$ lying between the said third equivalent time value and the said second equivalent time value ($t_{xx} \leq t_0 \leq t_{100}$), it is such that the function $X(t_0)$ passes through an intermediate point consisting of the said intermediate value of the equivalent degree of vulcanization ($X(t_{xx})$) and terminates with a horizontal tangent at a point consisting of the said second value of equivalent degree of vulcanization $X(t_{100})$, where C is equal to $1-X_\infty$, $X_\infty$ being a fourth, asymptotic value of the equivalent degree of vulcanization which is present for the equivalent time value tending towards infinity, and where each pair of the aforesaid parameters (n, k; $n_x$, $k_x$; $n_R$, $k_R$) is determined by setting a corresponding pair of values of equivalent degree of vulcanization ($X_1$, $X_2$), determining the corresponding equivalent vulcanization times ($t_1$, $t_2$) by the procedure described in point c), and obtaining from each of the aforesaid three equations a system of two equations with three unknowns.

Preferably, in said step b) the said temperature (T) is determined by means of the following steps:

b1) finite element modelling of the said tire and the said mould by means of a lattice (mesh) formed from specified finite elements and nodes;

b2) assigning initial contour conditions by the association of specified initial temperatures with each of the aforesaid nodes, b3) determining the variation in time of the temperature and convection coefficient of the said fluids for supplying heat to the said mould during the said vulcanization, b4) determining the variation in time of the temperature and convection coefficient of the said cooling fluid during the cooling of the said tire, b5) determining the change in time of the said temperature $T(t)$ at specified points within the said tire and the said mould, by means of the Fourier equation for heat transmission, solved by the finite element method.

Advantageously, the said specified function by means of which the said equivalent vulcanization time $t_0$ is determined in step c) is expressed as follows:
where $T(t)$ is found in the preceding step b5), and $\alpha$ and $\beta$ are determined by means of three isothermal rheometric diagrams obtained from test specimens of each mixture at three specified temperatures ($T_A$, $T_B$, $T_C$), each rheometric diagram representing the change of the torque S' and of the corresponding degree of vulcanization ($X_A(t)$; $X_B(t)$; $X_C(t)$) of the said mixture as a function of time, $\beta$ being found by means of the aforesaid equation using the aforesaid three temperatures ($T_A$, $T_B$, $T_C$) and three time increments ($\Delta t_A$, $\Delta t_B$, $\Delta t_C$) which cause the degree of vulcanization to change from a first specified value $X_{11}$ to a second specified value $X_{21}$ in the aforesaid three rheometric diagrams, and α is found by means of the aforesaid equation using two of the aforesaid temperatures ($T_A$, $T_B$) and two of the said time increments ($\Delta t_A$, $\Delta t_B$) of two of the aforesaid three rheometric diagrams.

Preferably, the method also comprises the following step:

e) determining a parameter consisting of a torque S' at a specified temperature T, given the aforesaid degree of vulcanization $X(t_0)$, by means of the following function:

$$S'(T, X) = S'_{min}(T) + X^*(S'_{max}(T) - S'_{min}(T))$$

where and where $S'_{min}(T_0)$=minimum torque at the said reference temperature $T_0$; $S'_{max}(T_0)$=maximum torque at the said reference temperature $T_0$; $D_{min}$=derivative of $S'_{min}$ with respect to the said temperature T; $D_{max}$=derivative of $S'_{max}$ with respect to the said temperature T.

Preferably, the aforesaid pair of values of the equivalent degree of vulcanization ($X_1$, $X_2$) consists of $X_1$=30% and $X_2$=60% for the aforesaid first equation.

In turn, the aforesaid pair of values of the equivalent degree of vulcanization ($X_1$, $X_2$) consists of $X_1$=60% and $X_2$=90% for the aforesaid second equation.

Preferably, the aforesaid pair of values of the equivalent degree of vulcanization ($X_1$, $X_2$) consists of $X_1$=20% and $X_2$=60% for the aforesaid third equation, the reduction of X for t tending towards infinity being set at $X_R$=100%.

The method according to the invention is based essentially on the determination of the temperature distribution within a tire as a function of time, by means of a finite element (FEA) modelling which simulates the change of the temperature at each point within the tire, given the history of the temperatures at the contour, and on the determination of the distribution of the consequent state of vulcanization by means of a vulcanization model implemented within the finite element model; the vulcanization model consists of a procedure (routine), integrated in the FEA model, which, instant by instant, determines the state of vulcanization at each point of the tire, using a model of the degree of vulcanization (X) based on the rheometric behaviour of the mixtures.

The method according to the invention requires the following input data:

structure and geometry of the tire;
thermodynamic characteristics of the mixtures;
geometry and conductivity of the mould;
vulcanization timetable;
conditions of cooling of the tire.

Normally, the vulcanization timetable is drawn up in tabular form and shows the variation in time of the temperature of the fluids supplying heat to the components of the mould, namely the sectors, the cheeks, and any vulcanization chamber or inner metal mould. The fluids consist of steam for heating the sectors (tread), steam for heating the cheeks (sidewalls), steam for the first inflation of the vulcanization chamber and water or inert gas for the second inflation of the vulcanization chamber.

The method provides the following output data:
map of the temperature distribution;
map of the true and conventional degree of vulcanization and of parameters connected with it (for example, the equivalent time and the torque).

In the method according to the invention, the FEA model is also extended to the mould and to the vulcanization chamber. By assigning the values of the temperatures which appear on the vulcanization timetable, therefore, the model can supply the correct temperatures at the contour of the tire.

The evaluation of the state of vulcanization by means of the degree of vulcanization has the advantage of using a parameter which is independent of the mixture; the vulcanization process is completed when the degree of vulcanization is equal to 1.

However, the conventional criterion of evaluation of the state of vulcanization, based on the equivalent times, has the disadvantage of being dependent on the mixture.

The method according to the invention makes it possible to adjust all the parameters which affect the vulcanization process, and in particular the vulcanization timetable which is normally adjusted to optimize the vulcanization process.

The method is a tool which is reliable, flexible, and easily used by an engineer (or process engineer) who is skilled in vulcanization processes. The method provides information both on the final state of the vulcanization process and on its variation in time, and details its characteristics within the structure of the tire. This enables the engineer to find critical problems and develop suggestions for their solution.

Characteristics and advantages of the invention will now be illustrated with reference to examples of embodiments shown by way of example and without restriction in the attached drawings, in which.

Figure 1:
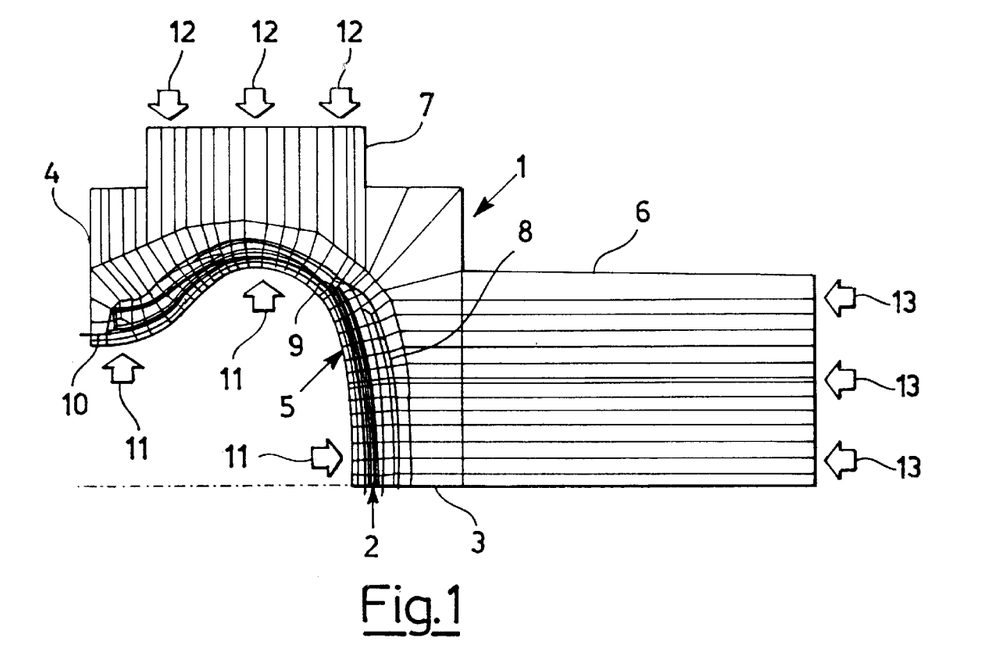
FIG. 1 shows schematically, in partial cross-section, a vulcanization mould and a tire placed within it, divided into elements according to an FEA model.

FIG. 1 shows part of a vulcanization mould 1 for a tire 2. In particular, an upper quarter of the mould 1 is shown. The mould 1 comprises sectors 3, an upper cheek 4, a vulcanization chamber 5, a sector holder device 6 and a cheek holder device 7. A lower cheek, which is a mirror image of the cheek 4, is not shown.

Normally, the mould receives heat from a fluid (usually steam) which passes through channels formed in the sector and cheek holder devices and which directly contacts the outer surface of the mould (steam dome vulcanizers).

Internally, the heat and pressure required for moulding are supplied by one or more fluids (steam, pressurized hot water, nitrogen, inert gas, etc.). A vulcanization chamber may or may not be present between the fluid and the tire. It is also possible to use an additional internal metal mould to which the heat would be supplied in a similar way to that in which it is supplied to the mould and the cheeks.

Examples of vulcanization cycles for tires are shown below:
1. Introduction of saturated steam (7 bars; 170° C.) into the vulcanization chamber=2'
2. Shut-off of steam and introduction of pressurized hot water (25 bars, 200° C.)=10'
3. Discharges=1'
Total=13'.
1. Introduction of saturated steam (15 bars; 201° C.) into the vulcanization chamber=5'
2. Shut-off of steam and introduction of pressurized nitrogen (26 bars)=9'
3. Discharges=30"
Total=14'30".

In both cases, the mould is heated to a given temperature by means of saturated steam (e.g. at 175° C.; 7.95 bars).

The steam may have a gradual pressure increase, by being made to pass through a throttle, and there may be more than one discharge (e.g. discharge into a pressurized circuit, followed by a second discharge into a low-pressure circuit and a third discharge into the atmosphere).

A finite element (FEA) model is applied to the mould 1 and to the tire 2 to simulate their behaviour during a vulcanization process.

The FEA model consists of the following parts: geometrical description; description of the materials; initial conditions at the contour; change in time of the conditions at the contour.

The output supplies the change of temperatures in time, from which the change of the state of vulcanization is found, as described below.

To proceed to the geometrical description, the FEA model is broken down into three separate components: the mould 1, the vulcanization chamber 5 and the tire 2. In these, the outer profile of the tire is identical to the inner profile of the mould and the inner profile of the tire is identical to the outer profile of the vulcanization chamber (FIG. 1).

Each of the three components is described by a set of finite elements, defined by their topology, and by a set of nodes defined by their spatial co-ordinates. The paired elements and nodes form a lattice (mesh) of the model. The nodes located on the contact surfaces between two components are separate—in other words the mould, chamber and tire do not have nodes in common—and therefore each component is assigned its own specific initial conditions. FIG. 1 shows a mesh formed from axially symmetrical two-dimensional elements with 4 nodes.

Preferably, the vulcanization chamber mesh is constructed on the original geometry rather than on the inflated geometry, and, before the thermal calculation, its inflation is simulated by a separate FEA calculation until it is brought into contact with the inner surface of the tire. This ensures a more precise distribution of the thicknesses of the chamber. Additionally, a denser mesh is used in areas in which a greater temperature gradient is expected (near the tire surfaces in contact with the mould and chamber, for example), and, conversely, a less dense mesh is used where the gradient is smaller (for example, in the mould which, being made from metal, has high conductivity).

To determine the temperature distribution, it is assumed that all the heat is supplied from the exterior, while the heat generated by the chemical reactions of the vulcanization process is assumed to be negligible. It is therefore a heat transmission process that is being described, and the value of diffusivity of the mixtures must be found in order to characterize them.

The exchange of heat by each component of the model with the exterior takes place through surfaces of which two types are distinguished, namely contact surfaces between separate meshes and outer surfaces.

The contact surfaces 8, 9 and 10 (shown in bold lines in the figure) are located between the tire and the mould, between the tire and the chamber, and, for the short section concerned, between the chamber and the mould. They ensure conduction between the two components in contact, and are characterized by a high coefficient of conductivity. They may be removed when one component is to be isolated from the other.

The outer surfaces are provided by the faces of the elements located on the outer surface. These are associated with a coefficient of convection by means of which heat is received from an external fluid which is shown in FIG. 1 with arrows 11, 12 and 13, located within the chamber and on the mould surfaces in contact with the steam.

The materials of the components of the model are described by the conductivity (k), specific heat (C) and density ($\rho$).

For the materials subject to the vulcanization process, three isothermal rheometric curves at three different temperatures are described for points, and from these all the parameters of the functions to be used for the determination of X are found by the method according to the invention.

The conductivity and the specific heat are determined, in terms of a heat conduction phenomenon, by means of the Fourier equation for heat transmission, solved by the finite element method:
which is a function of the diffusivity $\alpha$ only, defined by:

The conductivity k is replaced by the diffusivity $\alpha$ by assigning the value of unity to the specific heat and density (C=1; $\rho$=1).

The diffusivity $\alpha$ is determined directly in the laboratory and since it is not constant with temperature, it is assigned in tabular form with the variation of temperature. For example, the values at two successive temperatures are provided, and an interpolation is made between them.

Various factors are taken into consideration for determining the diffusivity of the tread. The FEA model uses axially symmetrical elements which represent only the grooves of the tread which are located circumferentially. To take into consideration the presence of grooves and sipes located transversely, the procedure is carried out by modifying the diffusivity of the tread mixture only in the area affected by these transverse grooves and sipes.

When the tire is in the mould, the metal strips of the sectors penetrate into the tread and considerably increase its mean diffusivity. During the cooling phase, however, the tire is outside the mould, and the grooves and sipes are occupied by air which reduces the mean diffusivity. A diffusivity which is variable with the conditions at the contour is therefore assigned, by using two values of diffusivity which depend on a parameter (FIELD) which is set to 0 when the tire is in the mould and is set to 1 when the tire is in air.

A mean diffusivity of a mould-rubber "mixture" and of an air-rubber "mixture" respectively is used to determine the two diffusivities.

The following are determined:
$R_v$=ratio of the area of voids (grooves, sipes) to the total area
$R_p$=ratio of the area of solid parts (blocks, ribs) to the total area
$\alpha_a$=diffusivity of the air $\alpha_s$=diffusivity of the mould (metal)

$\alpha_g$=diffusivity of the rubber.

The two mean diffusivities, mould-rubber ($\alpha_{sg}$) and air-rubber ($\alpha_{ag}$), are given respectively by:
where the two ratios $R_v$ and $R_p$ are calculated for a total area which excludes the circumferential grooves and is $R_v+R_p=1$.

To determine the diffusivity of the fabrics, allowance is made for the fact that the elements containing fabrics with metal cords not only have a increase in diffusivity due to the presence of the metal, but also have an anisotropic diffusivity due to the particular orientation of the wires (cords).

For each fabric, three diffusivities are identified in the three main directions of the fabric:

$\alpha_=$=diffusivity parallel to the wires $\alpha_+$=diffusivity perpendicular to the wires in the direction of the thickness of the fabric $\alpha_x$=diffusivity perpendicular to the wires and parallel to the surface of the fabric.

These define an orthotropic vector of diffusivity.

Let $V_g$=specific volume of the rubber $V_f=1-V_g$=specific volume of the wire $\alpha_f$=diffusivity of the wire $\alpha_g$=diffusivity of the rubber.

If the thickness of the wire is equal to the thickness of the fabric, it may be considered that $\alpha_==\alpha_+$, and therefore:

$$\alpha_==\alpha_+=\alpha_g V_g+\alpha_f V_f \quad (4)$$

If the thickness of the fabric is greater than the thickness of the wires, this difference is taken into account for the determination of $\alpha_x$ and $\alpha_+$.

Let $\Phi$=thickness of the wire

H=thickness of the fabric $V_i=\Phi/H$ internal specific volume (i.e. in the thickness of the wire)

$V_e=1-V_i$=external specific volume (i.e. of the outer layer of rubber)

$S_f=V_f/V_i$=specific volume of the wire with respect to the internal volume $S_g=1-S_f$=specific volume of the rubber with respect to the internal volume; then $\alpha_=$is identical to (4)

For H=$\Phi$, (6) is identical to (4) and (7) is identical to (5).

Given the diffusivity in the three characteristic directions of the fabric, the diffusivity is determined in the following directions of the tire: circumferential (3), meridian (2) and perpendicular (1), according to the cutting angle θ, in other words the angle of inclination of the cords with respect to a circumferential line:

The inventors have found that, in order to optimize the thickness of the vulcanization chamber, it is possible to redesign the geometry and mesh of the chamber on each occasion through simulation of the variation of thickness obtained by adjusting the conductivity and the specific heat.

Using a notation where $S_M$ is the thickness of the model and $S_R$ is the real thickness, $k_M$ is the conductivity of the model and $k_R$ is the real conductivity, $C_M$ is the specific heat of the model and $C_R$ is the real specific heat, and if $R=S_M/S_R$, it follows that $k_M=k_R\,R$ $C_M=C_R\,R$ When the thickness of the chamber is reduced, the conductivity increases, and, simultaneously, the thermal capacity is also reduced to take into account the reduction of the volumes.

The initial conditions are assigned by associating with each node of the model the temperatures which are present at the start of the vulcanization process. The ambient temperature is assigned to the tire, while the temperatures assigned to the mould and to the vulcanization chamber are those present at the start of the cycle when these components are operating in normal conditions.

The temperature of the chamber is assigned with a constant value in each node. The value is measured experimentally between one cycle and the next, a moment before the closing of the mould, in a vulcanization process similar to that under examination. For guidance, it is approximately half of the maximum temperature of the heating steam.

The temperature of the mould, however, is assigned in such a way that it is variable inside the mould, since, although the supply of steam is continuous, the inner surface of the mould is cooled whenever it is opened. At least three initial temperatures are therefore assigned, namely the steam temperature at the sectors, the steam temperature on the lateral plates, and the temperature of the inner surface measured experimentally a moment before the closing of the mould, as for the vulcanization chamber. The temperatures are distributed in the body of the mould in a steady-state cycle. According to an effective method, the mould is isolated from the rest of the model by removing the contact surfaces, the temperatures are assigned to the contour, and, with the steady-state cycle, the temperatures of the internal nodes are determined as if the mould was in the steady-state situation. The contact surfaces are then re-activated to continue the simulation.

The conditions at the contour are assigned by means of the history of the temperatures of the fluids which heat (or cool) the surfaces and the convection coefficients (film coefficients) of these fluids.

The process is carried out in two steps: a vulcanization (curing) step in which the tire is in the mould, and a cooling (post-curing) step during which the vulcanization process continues outside the mould. Within each step, the temperatures are determined by linear integration carried out by dividing the step into numerous time increments of a sufficiently small size to provide high precision without excessively extending the simulation time.

In the vulcanization (curing) step, the temperatures are assigned either directly, the steam temperatures in the mould being constant, or by means of a diagram of the temperatures of the heat-supply fluids as a function of time, plotted for individual points.

The convection coefficients are constant with respect to the value at the mould, and are assigned directly. In the chamber, however, the fluid changes from water to steam (or in some cases $N_2$), and therefore the corresponding convection coefficient also varies. In this case, the convection coefficient is assigned for individual points by means of a diagram plotted as a function of time.

The cooling (post-curing) step is carried out by removing all the contact surfaces in such a way as to interrupt the supply of heat to the tire. The temperature of the surrounding atmosphere, with its convection coefficient, is applied to the whole of the outer surface of the tire. This coefficient depends on the mobility of the external fluid, and may therefore vary in the different areas: it is usually kept lower where the air is still, as at the bottom of grooves and on the internal liner surface of the tire.

If the cooling takes place in a free atmosphere, this is kept at constant temperature (slightly higher than the ambient temperature); however, if it takes place in a thermally insulated box, the ambient temperature increases during the cooling the tire. In this second case, the value of the air temperature is adjusted with each increment, as a function of the heat leaving the tire, the volume of air contained, and the insulation characteristics of the box.

The cooling step is interrupted when the temperature reaches negligible values at the end of the vulcanization process.

The variation of the temperature (output) is calculated at the points of integration of the elements and can also be extrapolated to the nodes. It can be represented by means of numerical values, diagrams or maps. This is an important data element, since it is used for the subsequent determination of the degree of vulcanization and helps the engineer to understand the phenomenon which is taking place. It is also used to validate the model, since it can be determined experimentally by means of thermocouples.

Figure 2:
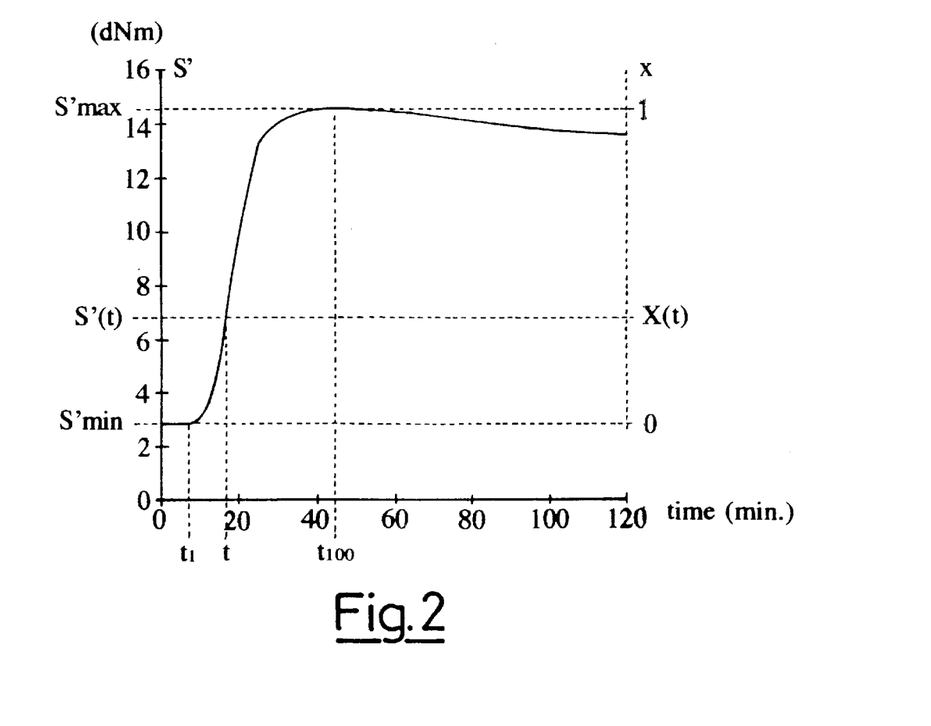
FIG. 2 is a diagram showing the change as a function of time of the torque S' and of the degree of vulcanization X of a test specimen of a rubber mixture.

In the method according to the invention, the vulcanization model is a semi-empirical model based on the rheometric behaviour of a rubber mixture represented by a curve of torque S' as a function of the time t (FIG. 2). The curve of S' indicates the elastic response of the mixture to the vulcanization process, and is found in the laboratory, for example by using a rheometer of the MDR 2000 type (Moving Die Rheometer) made by Monsanto. The vulcanization process is carried out at constant temperature and provides a isothermal rheometric curve.

The degree of vulcanization (X) is defined on the basis of the minimum and maximum values taken by S'. If the rheometric profile (FIG. 2) is examined, it will be found that, after an initial period (called the induction time) in which S' maintains a minimum constant value $S'_{min}$, S' starts to rise up to a maximum value $S'_{max}$.

The degree of vulcanization X at the instant t is given by the relation:

which is a dimensionless value. It expresses the vulcanization state in terms of the torque S':

$X(t)=0$ for $S'=S'_{min}$, in other words at the start of vulcanization (instant $t_1$), $X(t)=1$ for $S'=S'_{max}$, in other words on the completion of vulcanization (instant $t_{100}$).

The degree of vulcanization (9) is valid for a rheometric diagram which is always increasing and tends to a horizontal asymptote. More frequently, however, the shape of the rheometric curve is such that the torque S', having reached a maximum value, decreases towards a horizontal asymptote located at a height below the maximum. When the vulcanization process passes along this descending section, it is said to be in reversion. During the reversion, the degree of vulcanization is less than 1, although the vulcanization is complete.

To allow for this fact, the inventors have considered the degree of vulcanization in reversion:
and the reversion time $t_R$:

$$t_R = t - t_{100} \quad (11)$$

where $t_{100}$ is the instant at which the torque reaches the maximum value $S'=S'_{max}$, as stated previously, and $S'_\infty$ is the torque to which the rheometric curve tends asymptotically.

However, this definition of the degree of vulcanization is valid only for isothermal process which can be carried out only in the laboratory on small test specimens. In the vulcanization of a tire, on the other hand, the process is always non-isothermal.

The method according to the invention provides a law of the variation of the degree of vulcanization which is valid for non-isothermal processes.

The inventors have observed that the velocity of the vulcanization process is directly correlated with the temperature, and have devised a function which enables processes carried out at different temperatures to be compared by means of a parameter consisting of the equivalent time.

If two isothermal vulcanization processes are carried out on the same type of mixture, the first at a reference temperature $T_0$ and the second at an arbitrary temperature T, the vulcanization time $t_0$ at the reference temperature $T_0$ is said to be equivalent to the time t for the second temperature T, if the degree of vulcanization found at the temperature $T_0$ at the instant $t_0$ is equal to the degree of vulcanization found at the temperature T at the instant t:

$X(T_0, t_0) = X(T, t)$

The Arrhenius formula and the Van't Hoff formula are commonly used for the determination of the equivalent time.

The Arrhenius formula is as follows:
where the temperatures are expressed in degrees Kelvin, $E_a$ is the activation energy of the mixture and R is the kinetic constant of the gases; the activation energy is a characteristic value of each mixture, and is found experimentally from two isothermal rheometric profiles at different temperatures.

The Van't Hoff formula is as follows:
where θ is the temperature difference required to halve the vulcanization time.

The inventors have verified, by experimental tests with the rheometer, that neither of the two laws is followed strictly, and that the first is more accurate for some mixtures while the second is more accurate for others. However, they have found a more accurate conversion law, expressed as follows, for determining the equivalent time $t_0$:
where, by making $\alpha = E_a/R$ and $\beta = 1$, the Arrhenius formula is obtained; by making $\alpha = (\log 2)/\theta$ and $\beta = 0$, the Van-t Hoff formula is obtained.

This conversion law (12) is used in the method according to the invention.

Figure 4:
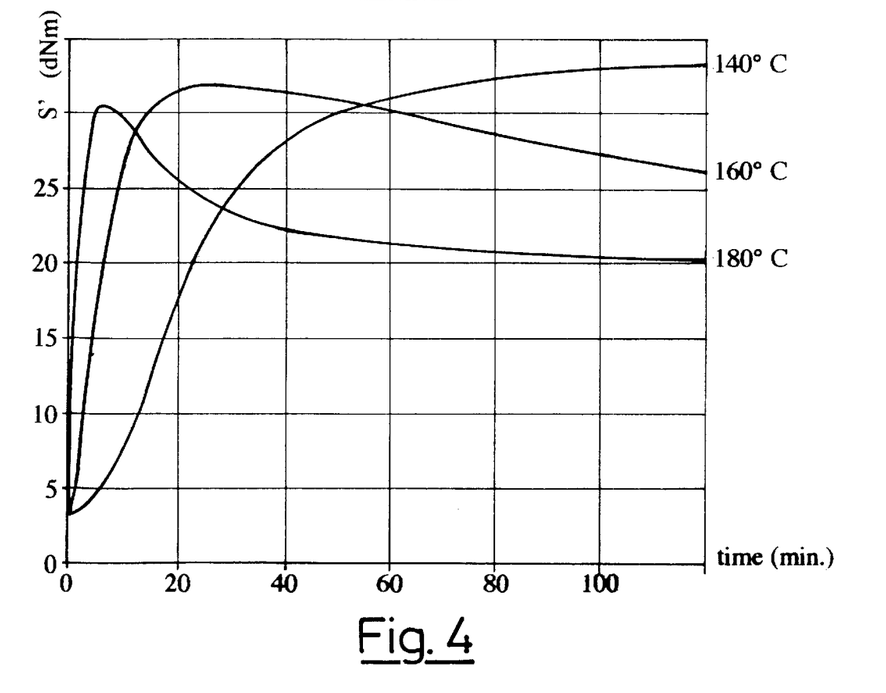
FIG. 4 shows the change of experimental rheometric profiles of a test specimen of a rubber mixture, found at three different temperatures.

To determine the coefficient α and the index β of the conversion law (12), use is made of three isothermal rheometric diagrams, such as those shown in FIG. 4, obtained by using test specimens of a specified mixture.

The index β is determined by specifying an interval (range) $(X_{11}, X_{21})$ of the degree of vulcanization and measuring on the three diagrams the corresponding time increments $(\Delta t_A, \Delta t_B, \Delta t_C)$ which make the degree of vulcanization change from $X_{11}$ to $X_{21}$. The coefficient α is found, unlike β, from the values of two temperatures.

Let $T_A, T_B, T_C$ be the three temperatures of the rheometric diagrams and let $\Delta t_A, \Delta t_B, \Delta t_C$ be the three corresponding time intervals.

Given that:

Since it has been found experimentally that the function is not independent of time, the parameter α is set to be dependent on the degree of vulcanization by means of a step function. In the practical implementation, the following are calculated:

a single value of β in the interval $0.3 \leq X \leq 0.6$ which is used for the whole rheometric diagram, and three values of α in the intervals $0.0 \leq X \leq 0.3$ $0.3 \leq X \leq 0.6$ $0.6 \leq X \leq XX$ where XX is an assigned value such that $0.9 \leq XX \leq 1.0$.

The value of α calculated for the last interval is also used for the rest of the rheometric diagram.

For calculating β (β is constant with the variation of X), it is assumed that:

$X_{11}$=30% and $X_{21}$=60%, in other words $\Delta t_A = t_{60}(T_A) - t_{30}(T_A)$
$\Delta t_B = t_{60}(T_B) - t_{30}(T_B)$
$\Delta t_C = t_{60}(T_C) - t_{30}(T_C)$.

For calculating α (α varies with the variation of X):

for $0 < X \leq 30\%$, the assigned values are $X_{11}$=0% and $X_{21}$=30% for $30\% < X \leq 60\%$, the assigned values are $X_{11}$=30% and $X_{21}$=60% for $X > 60\%$, the assigned values are $X_{11}$=60% and $X_{21}$=XX% where $90\% \leq XX\% \leq 100\%$) is selected at the engineer's discretion (for example, XX% is set at 90%).

The method according to the invention is applied to a variable-temperature vulcanization process, and is based on the solution of plotting an equivalent isothermal rheometric curve at a given reference temperature (FIG. 3), using the aforesaid conversion law (12). The degree of vulcanization is found from the equivalent isothermal rheometric curve.

The degree of vulcanization X is given for each instant t by the following relation:

$X(t) = X(t_0)$ where the equivalent time $t_0$ is determined by means of the aforesaid conversion law (12).

The inventors have divided the rheometric curve into three consecutive sections, consisting of two principal sections joined by a linking section, which have the following equations:

where the first equation is valid for $t_0 \leq t_{60}$, where $t_{60}$ is the equivalent time at which there is an equivalent degree of vulcanization $X(t_{60})$=60%; the second equation is valid for $t_{60} \leq t_0 \leq t_{100}$, where $t_{100}$ is the equivalent time at which there is an equivalent degree of vulcanization $X(t_{100})$=100% or 1; and the third equation is valid for $t_0 \geq t_{100}$.

In the system of equations (15), $t_{xx}$ is a value intermediate between $t_{60}$ and $t_{100}$, at which there is an equivalent degree of vulcanization $X(t_{xx})$=90% ($X(t_{xx})$ corresponds to the value XX% cited above); in turn, $f(t_0-t_{xx})$ is an interpolation function which is equal to 0 for $t_0 \leq t_{xx}$, while, for $t_{xx} \leq t_0 \leq t_{100}$, it has a variation such that it passes through an intermediate point consisting of the equivalent degree of vulcanization $X(t_{xx})$ and terminates with a horizontal tangent at a point consisting of the equivalent degree of vulcanization $X(t_{100})$. For example, $f(t_0-t_{xx})$ is a cubic function. Finally, C is equal to $1-X_\infty$, where $X_\infty$ is the asymptotic value to which the degree of vulcanization tends for t tending to infinity.

The first equation consists of a known Isayev-Deng function, while the second and third equation have been discovered by the inventors. Of these, the third equation consists of a function similar to the Isayev-Deng function, but translated, scaled and inverted; the second equation consists of a linking function which provides continuity with the other two functions.

To plot an equivalent isothermal rheometric curve at a given reference temperature, the pair of parameters n, k for $t_0 \leq t_{60}$ (initial section), the pair of parameters $n_x$, $k_x$ for $t_{60} \leq t_0 \leq t_{100}$ (interpolation section), and the pair of parameters $n_R$, $k_R$ for $t_0 \geq t_{100}$ (reversion section) are determined within the system of equations (15).

For each of the said sections, a corresponding pair of values of equivalent degree of vulcanization $(X_1, X_2)$ is set. For example, for the initial section the pair 30% and 60% is used; for the interpolation section, the pair 60% and XX% (90%) is used; for the regression section, the pair $X_R$=20% and $X_R$=60% is used, with the reduction of X for t tending to infinity $X_R$ set at 100% ($X_R$ is calculated by means of the relation (10)).

For each pair $(X_1, X_2)$, the corresponding equivalent vulcanization times $(t_1, t_2)$ are determined. Since the plot of the rheometric curve at the equivalent temperature is not usually available, the times are determined from a diagram plotted for a different temperature, using the aforesaid conversion law (12).

To determine each pair of the aforesaid parameters (n, k; $n_x$, $k_x$; $n_R$, $k_R$), use is made of a system of two equations with two unknowns, obtained from each of the three equations (15). For example, the value of the index n is determined initially, and the value of the coefficient k is then found. This is because, once n has been determined, a single point, for example $(t_1, X_1)$ is sufficient for the determination of k.

In particular, the following system:

is used to obtain the index n and the coefficient k:

The formulae (16) and (17) are also used to determine $n_R$ and $k_R$ of the section in reversion, taking into account the degree of vulcanization in reversion expressed by the formula (10).

To determine the linking function, in other words the second equation of the system (15), two cases are distinguished (FIG. 3): a case in which $t_{xx}=t_2$ and a case in which $t_2<t_{xx}<t_{100}$.

Figure 3:
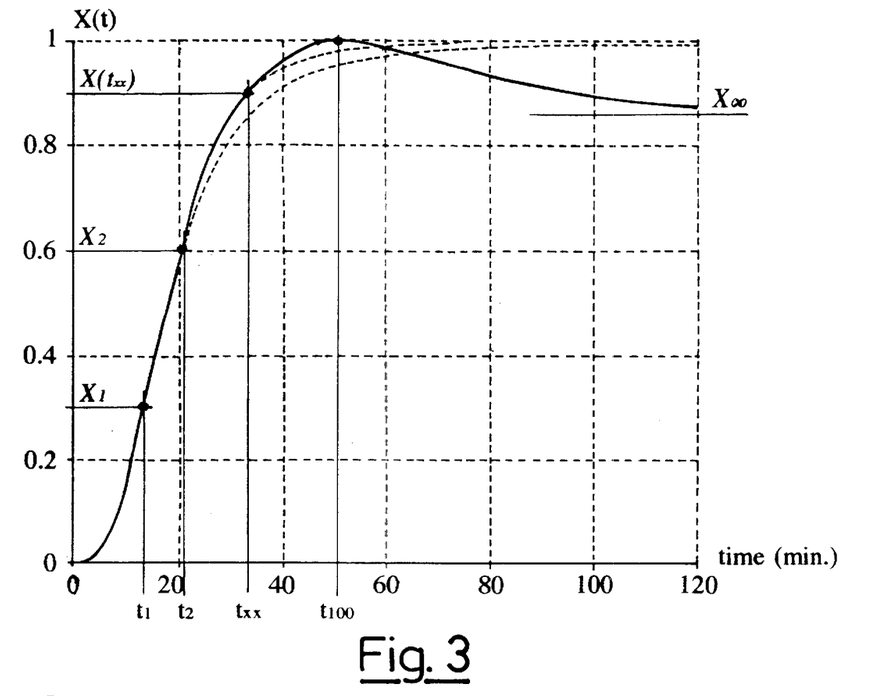
FIG. 3 is an equivalent isothermal rheometric curve, determined by the method according to the invention.

In the first case, the ascending section of the rheometric curve passes through three points identified by $t_1$, $t_2$ and $t_{100}$; in the second case, it also passes through a fourth point $t_{xx}$ lying between $t_2$ and $t_{100}$.

In the first case, it is assumed that $n_x$=n and $k_x$=k.

In the second case, formulae (16) and (17) are used to determine the first term of the second equation (15) passing through $(t_2, X_2)$ and $(t_{xx}, X_{txx})$.

The function $f(t-t_{xx})$ is zero for a negative $t=t_{xx}$ and is, for example, a section of cubic function with extremes tangent to the two linked branches for t lying between $t_{xx}$ and $t_{100}$.

The cubic function corrects the first term of the second equation (15), causing it to take the value of 1 with a horizontal tangent at $t=t_{100}$ and causing it to be tangent to itself at $t=t_{xx}$. The cubic function and its derivative are therefore zero at $t=t_{xx}$. The two coefficients $c_2$ and $c_3$ of the linking cubic function are determined by setting the conditions in $t_{100}$. If X' denotes the derivative of X with respect to time and $X_x(t)$ and $X'_x(t)$ denote the first part of the formula and its derivative respectively, $$\begin{cases} X(t_{100}) = 1 = X_x(t_{100}) + c_2(t_{100} - t_{xx})^2 + c_3(t_{100} - t_{xx})^3 \\ X'(t_{100}) = 0 = X'_x(t_{100}) + 2c_2(t_{100} - t_{xx}) + 3c_3(t_{100} - t_{xx})^2 \end{cases}$$

Given that $z = t_{100} - t_{xx}$
$A = 1 - X_x(t_{100})$
$D = -X'_x(t_{100})$
we obtain $$\begin{cases} c_2 = \dfrac{3A - zD}{z^2} \\ c_3 = \dfrac{zD - 2A}{z^3} \end{cases} \tag{19}$$

In FIG. 3, the extensions of the first section and the first part of the second section of the curve X(t) beyond their extremes of definition are shown in broken lines.

For example, as stated previously, it is assumed that: for the first section, $t_1=t_{30}$ such that $X_1=X(t_1)=0.3$ $t_2=t_{60}$ such that $X_2=X(t_2)=0.6$ and, for the section in regression, $t_1=t_{120}$ such that $X_{1rev}=X_R(t_1)=0.2$ $t_2=t_{160}$ such that $X_{2rev}=X_R(t_2)=0.6$.

For the linking section, the value $t_{xx}$ is selected in such a way as to copy the experimental curve exactly. In particular, $t_{xx}=t_{90}$ is used, such that $X(t_{90})=0.9$.

The method according to the invention can be used to determine the torque S' (elastic component) of a non-isothermal rheometric profile and therefore makes it possible to validate the vulcanization model, since S' is a value which can be measured experimentally.

S' depends, with a good approximation, on the degree of vulcanization X and on the temperature reached, and decreases linearly with a rise in the latter.

For the definition of the degree of vulcanization X (formula (9)), for a generic temperature T, the torque S' is represented by the following function:

$$S'(T, X) = S'_{min}(T) + X*(S'_{max}(T) - S'_{min}(T)) \qquad (20)$$

where $$\begin{cases} S'_{min}(T) = S'(T, 0) = S'_{min}(T_0) + D_{min}(T - T_0) \\ S'_{max}(T) = S'(T, 1) = S'_{max}(T_0) + D_{max}(T - T_0) \end{cases}$$

and where $S'_{min}(T_0)$=minimum torque at the reference temperature $T_0$; $S'_{max}(T_0)$=maximum torque at the temperature $T_0$; $D_{min}$=derivative of $S'_{min}$ with respect to the temperature T; $D_{max}$=derivative of $S'_{max}$ with respect to the temperature T.

The values of the maximum and minimum torque at the reference temperature and the corresponding slope are determined from the values of maximum and minimum torque and the corresponding temperatures for two rheometric profiles, given the reference temperature $T_0$.

Therefore, in the method according to the invention, the finite element (FEA) model described above yields the distribution of the temperature in time within a tire during the process of vulcanization, and the vulcanization model implemented in it can be used to determine the degree of vulcanization reached in the cycle of vulcanization of the tire.

In practice, the state of vulcanization of the tire is determined at each point of integration by means of a procedure (routine) divided into two parts, namely a variable part and a constant part. The first consists of a block of input data which describe the rheometric characteristics of the mixtures used in the model under examination; the second can be used to determine the state of vulcanization with the variation of the temperature in time and supplies output data consisting of the degree of vulcanization and parameters which can be used for the analysis of the process, and which are. described below.

In the first part of the procedure, the following variables are assigned:

number of materials listed;

reference temperature ($T_0$) for the determination of the equivalent times $t_0$ (the default value is 151° C.);

reference degree of vulcanization $X_{REF}$ to which the equivalent times are to be related to obtain standardized time values (the default value is 0.9).

For each mixture, the variables which describe its rheometric characteristics are assigned. In particular, two rising rheometric profiles (curves) are described for two temperatures, and a rheometric profile of the section in regression, found experimentally by using test specimens of the mixture. The index β of the formula (12), or, alternatively, two points of a rheometric profile at an intermediate temperature, are also supplied. The rheometric profiles are defined by three points: for the rising sections, the times relating to degrees of vulcanization of 30%, 60% and XX% are given (with 60%<XX%<100%); for the section in regression, the times relating to the reversion degrees of vulcanization ($X_R$) 0%, 20% and 60% are given.

The following parameters are assigned:

name of the mixture, for the first rheometric profile (at the lower temperature): Temperature (for example 140° C.); Minimum torque; Maximum torque; Time for X=30%; Time for X=60%; Time for X=XX%;

for the second rheometric profile (at the higher temperature): Temperature (for example 160° C. for an outsize tire and 180° C. for a car tire); Minimum torque; Maximum torque; Time for X=30%; Time for $X_R$=60%; Time for X=XX%;

for the regression rheometric profile: Temperature (for example 160° C. for an outsize tire and 180° C. for a car tire); Maximum torque in regression; Minimum torque in regression; Time for $X_R$=0%; Time for $X_R$=20%; Time for $X_R$=60%;

to determine the index β, the thermal profile is given: Temperature (for example 151° C.); Time for X=30%; Time for X=60%.

The second part of the procedure supplies the following output data:

SV1=Equivalent time at the reference temperature (this is the base for the determination of the degree of vulcanization X; it has the advantage with respect to this of showing the time elapsed after X=1 has been reached, although it has the disadvantage of being dependent on the mixture);

SV2=Standardized equivalent time at a reference degree of vulcanization $X_{REF}$ (this is given by the ratio between the equivalent time reached and that corresponding to a reference degree of vulcanization $X_{REF}$, equal to 0.9 for example, above which the vulcanization starts to be considered good; it has the advantage of being independent of the mixture);

SV3=Standardized equivalent time at X=100% (this differs from SV2 in that the reference degree of vulcanization $X_{REF}$ is equal to 1 in this case);

SV4=Conventional degree of vulcanization (this is used to show on the maps that the maximum vulcanization values have been exceeded, and is defined by the relation (9) for $X \leq 1$ and by $$2 - \frac{S'(t) - S'_{min}}{S'_{max} - S'_{min}} \text{ for } X \geq 1 \text{ (case of reversion)};$$

SV5=Torque (this is the torque S' corresponding to the degree of vulcanization calculated and measured on the rheometric diagram at the current temperature; it can be used to experimentally validate the results of the calculation);

SV6=Logarithmic standardized equivalent time, equal to log (SV2);

SV7=Logarithmic standardized equivalent time, equal to log (SV3);

SV8=Actual degree of vulcanization (defined by the relation (9); can be used to note immediately, in diagrams as a function of time, any situations of reversion).

The second part of the procedure is started by collecting from the finite elements FEA model the data relating to a point of integration of the element under examination at the current instant, and, in particular, the temperature, the name of the mixture, the time increment, the output data (SV1, SV2, SV3, SV4, SV5, SV6, SV7, SV8) calculated in the preceding increment. The procedure supplies the updated output data.

When the second part of the procedure is executed for the first time, the data of all the mixtures stored in the archive are read in the first part, and the coefficients required for the subsequent calculations are determined for each of them. After this, whenever the second part of the procedure is executed, the following successive operations are carried out:

identification of the parameters of the mixture;
determination of the equivalent time (SV1) and of all the other variables obtainable from this;
determination of the standardized equivalent times (SV2, SV3, SV6, SV7);
determination of the conventional degree of vulcanization (SV4);
determination of the actual degree of vulcanization (SV8);
determination of the torque (SV5) of the actual degree of vulcanization.

An auxiliary sub-procedure (subroutine) makes it unnecessary to calculate the characteristic parameters of a mixture whenever the aforesaid procedure is executed. The auxiliary procedure reads the data of each of the mixtures catalogued in the first part of the procedure, and these are translated (converted) to the reference temperature once for all. They are then converted into parameters required for the calculation and made available for subsequent processing. The parameters are:

Coefficients of the relation (12), in other words the coefficient $\alpha$ for $0.0<X<0.3$; the coefficient $\alpha$ for $0.3<X<0.6$; the coefficient $\alpha$ for $0.6 \leq X$; the index $\beta$; ($\beta$ is calculated by means of the relation (13), the values of $\alpha$ are calculated by means of the relation (14));

Coefficients describing the equivalent isothermal rheometric curve at the reference temperature $X=X(t_0)$ (15), in other words the coefficient k of the first section of the curve for $0.0<X<0.6$; index n of the first section of the curve for $0.0<X<0.6$; coefficient $k_x$ of the second section of the curve for $0.6<X<XX$; index $n_x$ of the second section of the curve for $0.6 \leq X \leq XX$; coefficient $c_2$ of the linking cubic function;

coefficient $c_3$ of the linking cubic function; coefficient $k_R$ of the reversion section of the curve; index $n_R$ of the reversion section of the curve;

Equivalent time T30, such that $X(T30)=0.3$;
Equivalent time T60, such that $X(T60)=0.6$;
Equivalent time TRF, such that $X(TRF)=X_{REF}$;
Equivalent time TXX; such that $X(TXX)=XX$ ($0.6<XX \leq 1$);
Equivalent time TMX, such that $X(TMX)=1$;
Minimum torque TQN at the reference temperature;
Derivative of the minimum torque DMN as a function of the temperature;
Maximum torque TQX at the reference temperature;
Derivative of the maximum torque DMX as a function of the temperature;
Ratio RXR of X in reversion ($\Delta TQrevers/\Delta TQrise$).

If the value of $\beta$ is not present in the data block, it is determined by means of the relation (13); the three values of $\alpha$ are then determined by means of the relation (14).

The equivalent times T30, T60 and TXX are determined by integration by means of the relation (12), from the aforesaid rheometric profile at the lower temperature.

The equivalent time TMX is determined by integration by means of the relation (12). To do this, the thermal profile starting from $t_0$ (in other words, from zero time) is required. Given that only $t_{100}$ is known for the regression curve, the missing data ($t_{30}$, $t_{60}$, $t_{xx}$) are initially determined, starting from T30, T60, TXX, by inserting the following in the relation (12): $T_0$=temperature of the reversion curve and T=reference temperature. TMX is then calculated, inserting $T_0$=reference temperature in the relation (12) this time. Continuing with the integration, the equivalent times of the other two points of the reversion curve are calculated ($X_R=20\%$ and $X_R=60\%$).

The coefficients and the indices of the equations (15) are determined by means of formulae (16) and (17), using the values of X and of the times at two points, while the coefficients $c_2$ and $c_3$ of the linking cubic function are determined by means of the formulae (19), using the times at the extremes (TMX TXX) and the parameters $n_x$ and $k_x$ of the curve to be linked, as illustrated above.

The minimum and maximum torques at the reference temperature and their derivatives (slope), (TQN, DMN, TQX and DMX) are determined by the values of minimum and maximum torque and corresponding temperatures for the two rheometric profiles, given the reference temperature.

The ratio RXR is the coefficient $C=(1-X_\infty)$ of the third equation (15). To determine this, $S'_{min}$ and $S'_{max}$ in reversion are first determined, and then the maximum reduction of S' in reversion is divided by their difference.

The equivalent time TRF is determined by inverting the function $X=X(t)$ for the reference value of X.

The parameters characterizing the mixture are identified from the name of the mixture.

The equivalent time increment is determined from the time increment and the temperature supplied by the FEA model. The temperature is kept constant during the time increase which is set.

The method according to the invention has been proved to be reliable, in that it is capable of exactly reproducing the variation of the temperatures measured experimentally and has been used with success in various practical situations, both for the optimization of the timetable and in the selection of the thicknesses of the vulcanization chamber.

The inventors have carried out validation tests of the method and, in particular, a validation of the FEA model for determining the temperatures and a validation of the procedure for determining the state of vulcanization.

For the first validation, vulcanization tests were carried out to measure the variation of the temperatures at certain significant points of the tire by the insertion of thermocouples. The variation of the temperatures of the fluids for supplying heat to the mould (steam and water) and on the surface of the mould in contact with the tire was also measured. To assign the correct initial conditions to the FEA model, the temperatures on the surface of the chamber and of the mould a moment before the insertion of the raw tire.

The FEA model for the comparison was constructed by assigning the measured conditions at the contour (water temperature and steam) and by requesting at the output the variation of the temperatures at the same experimental measurement points.

Figures 5, 6:
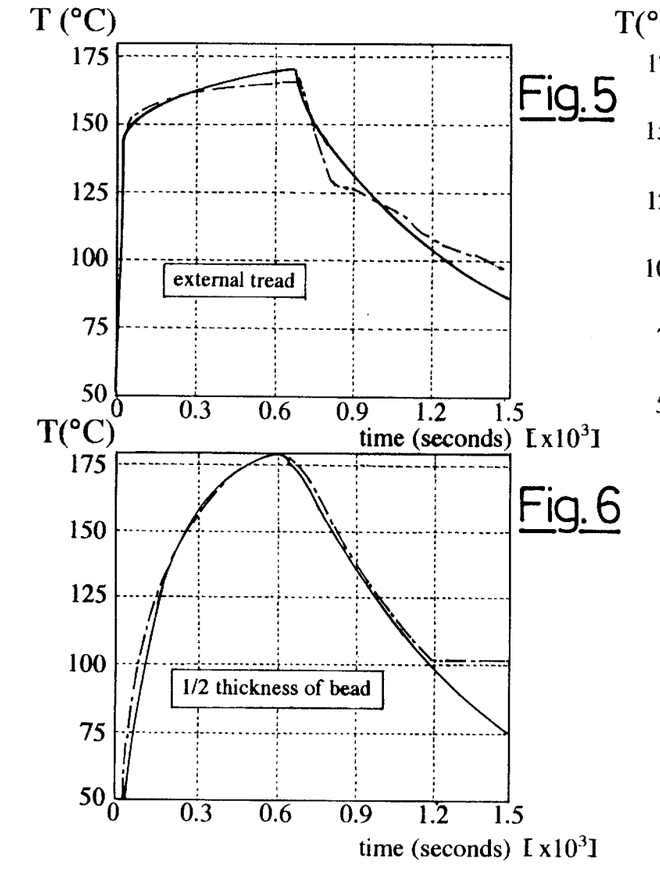
FIGS. 5, 6 and 7 show experimental and calculated temperature profiles at three points of a specified tire.
Figure 7:
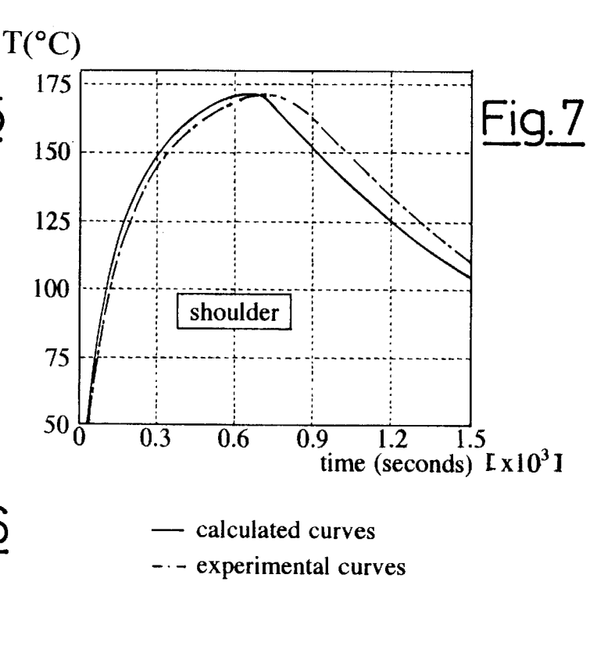

FIGS. 5, 6 and 7 show the comparison between the experimental and calculated temperature profiles at three points of a P3000 175/65 R14 tire. It may be seen that the differences between the experimental and calculated temperature profiles are very small.

Figure 8:
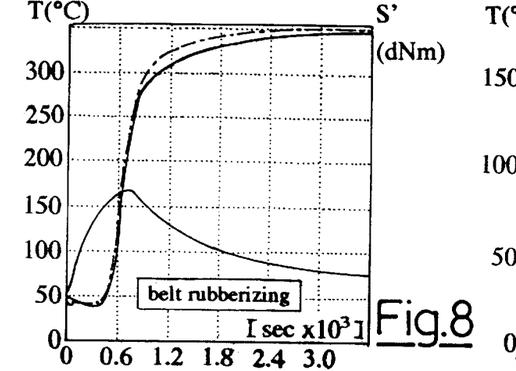
FIGS. 8, 9 and 10 show the torque/time graphs, experimental and calculated, at some points of a specified tire.
Figure 9:
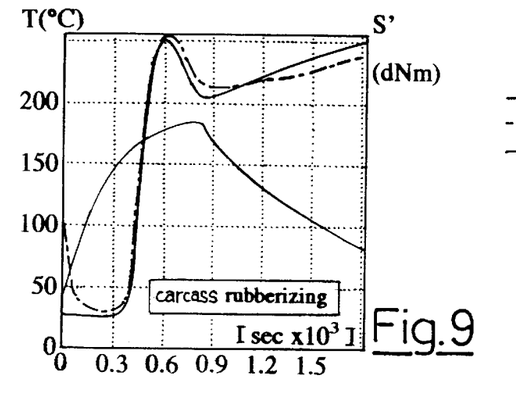
Figure 10:
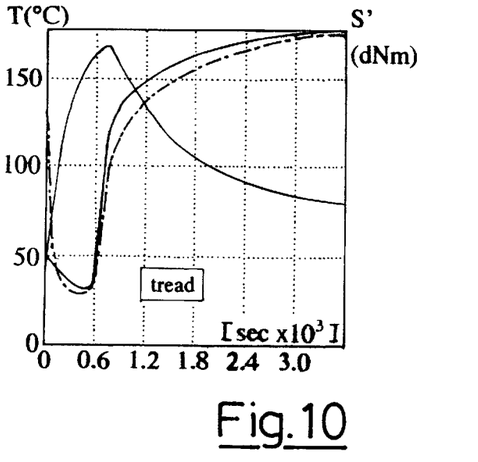

For the second validation, allowance was made for the fact that the only parameter for which experimental data could be obtained was, as stated previously, the torque S', measured by means of the MDR 2000 rheometer with a variable thermal profile test. The thermal profiles measured experimentally on a tire (or calculated with the FEA model), used for the validation of the temperatures and associated with different mixtures, were used. The same profile was introduced into the procedure for the determination of the state of vulcanization, directly or by means of an FEA calculation carried out on a single element. FIGS. 8, 9 and 10 show the experimental and calculated torque/time graphs for certain points of a P6000 205/60 R15 tire. When the experimental and calculated graphs are compared, it will be seen that the results are more than satisfactory.

Some examples of the application of the method according to the invention are given below:

EXAMPLE 1

Verification of the Degree of Vulcanization of a Mixture with Rheometric Characteristics Different from the Design Characteristics Mixtures having rheometric characteristics different from the development characteristics are frequently used in tire production. For example, the use of natural rubber from Thailand in a belt rubberizing mixture (AMET) gives rise to a vulcanization kinetics which is significantly slower than that found with a mixture containing natural rubber from Malaysia. Although this is not critical in the case of "long" vulcanization cycles, the slower mixture becomes unacceptable when the vulcanization cycle is reduced to the minimum technically feasible levels.

Figure 11:
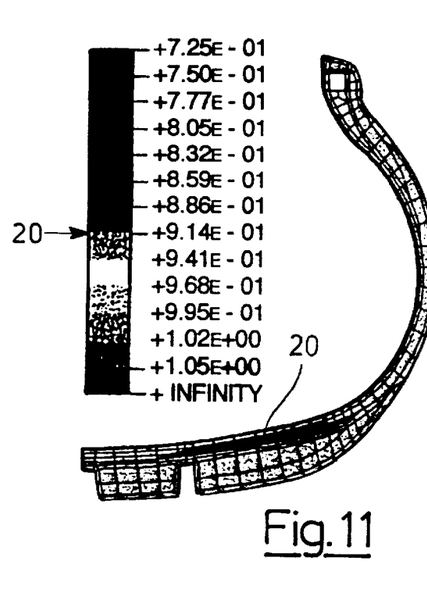
FIGS. 11 and 12 show the levels of vulcanization of two tires, determined by the method according to the invention.
Figure 12:
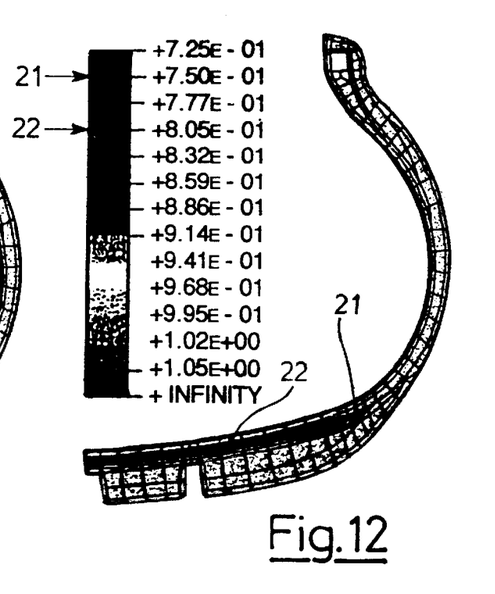

FIGS. 11 and 12 show the results obtained with the method according to the invention for two P3000 tires, with a vulcanization timetable of 10'00", and an AMET mixture with two different rheometric profiles, one at 151° C. with $t_{90}$=19' (FIG. 11), the other at 151° C. with $t_{90}$=28' (FIG. 12). It will be observed that, in the first case ($t_{90}$=19'), the belt rubberizing mixture 20 is at the vulcanization level of approximately 90%, while with the slower mixture the belt end 21 is at approximately 75% and does not exceed 80% even at the less critical points 22.

EXAMPLE 2

Definition of an "Optimal" Vulcanization Cycle by Modification of the Materials

By means of a chemical-physical analysis of the vulcanization (post-curing), it was found that in the case of car tires (P6000 205/60 R15) a reduction of the machine cycle followed by controlled cooling did not achieve a significant reduction in the over-vulcanization of the rubberizing mixture (especially for the carcass). More stable belt and carcass rubberizing mixtures were therefore developed, and the "optimal" cycle was calculated by the method according to the invention. The calculated results were then verified experimentally.

Figure 13:
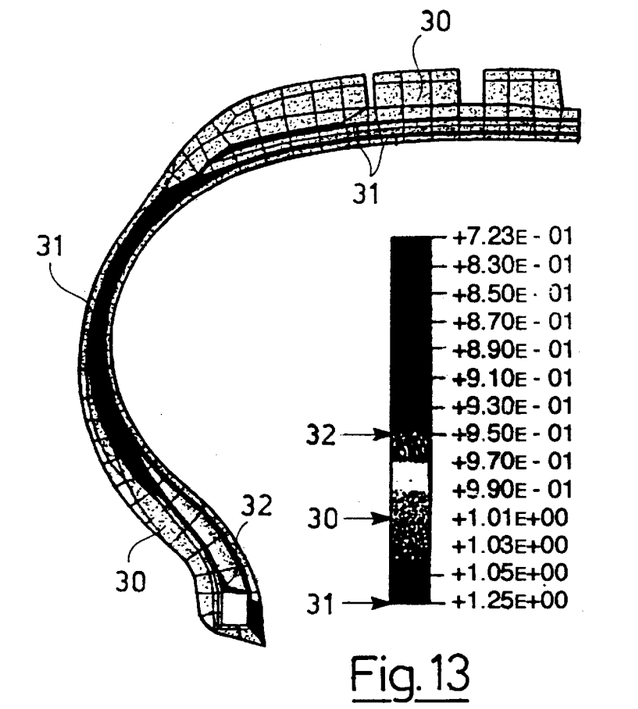
FIGS. 13 and 14 show the levels of vulcanization of another two tires, determined by the method according to the invention.

FIG. 13 shows the final level of vulcanization (30–32) reached in the aforesaid P6000 tire with a cycle of 14' and n.p. (normal production) materials.

Figure 14:
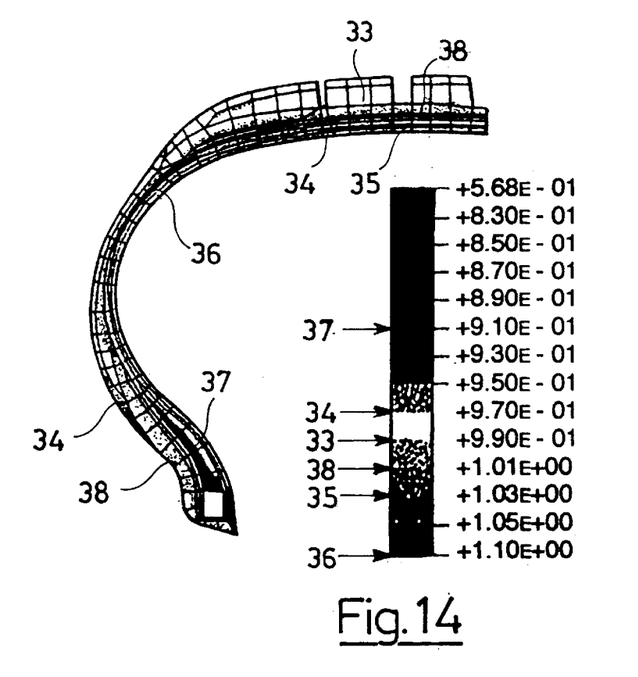

FIG. 14 shows the final level of vulcanization (33–38) reached in the aforesaid P6000 tire with a cycle of 12'00".

EXAMPLE 3

Optimization of the Vulcanization Cycle with Reduction of the Thickness of the Vulcanization Chambers The inventors have found that, in the case of reduction of the thickness of the vulcanization chambers (from 6 to 4.5 mm), a simple reduction of the cycle time is insufficient to optimize the level of vulcanization at the different points of the tire. The inventors were able to define an "optimal" cycle by means of a regression carried out on the results of $3^4$=81 FEA simulations of vulcanization timetables.

The following independent variables were used:
1. the temperature of the mould heating steam (175° C., 180° C., 185° C.),
2. the temperature of the cheek heating steam (170° C., 175° C., 180° C.),
3. the time of the initial inflation with steam (180", 210", 240"),
4. the total cycle time (10'45", 11'15", 12'00").

81 cases were carried out and the results were processed by a statistical program, resulting in the specification of a vulcanization cycle of 10'45" in total as against 11'15" in the case of n.p. In the optimized vulcanization cycle, the initial inflation time was reduced from 4' to 3'45", and the temperature of the cheek heating steam was lowered from 173° C. to 165° C.. The optimized cycle reproduces levels of vulcanization close to those of the n.p. and limits the excessive over-vulcanization. On the other hand, a simple reduction of the cycle does not resolve the problem but, unexpectedly, causes over-vulcanization, as shown in Table 1.

Table 1 shows the results obtained, expressed as standardized equivalent times (equivalent time/$t_{90}$ at 151° C.).

EXAMPLE 4

Figure 15:
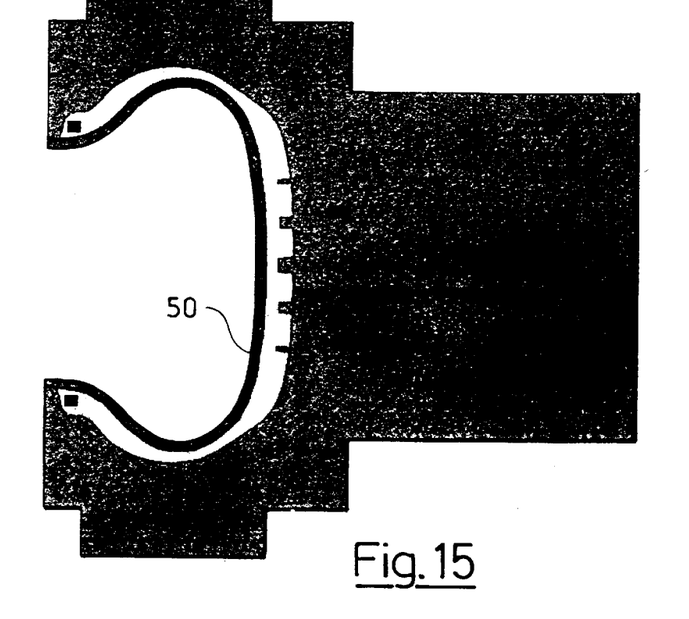
FIGS. 15 and 16 are cross-sectional views of a vulcanization mould containing a tire and of a tire respectively.
Figure 16:
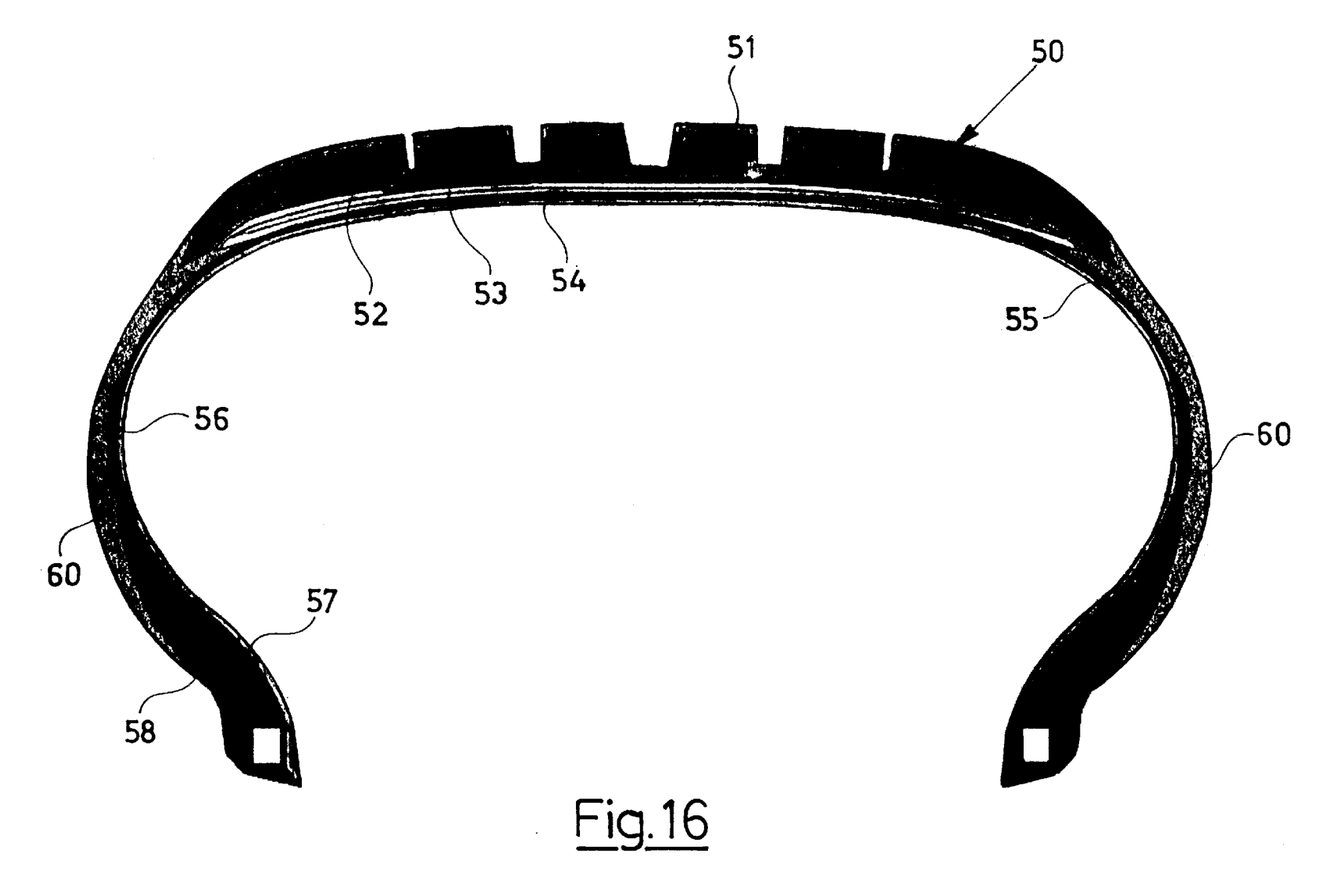

The method according to the invention was used to analyse the degree or level of vulcanization of a car tire 50 (FIGS. 15 and 16), called P6000 and graded 205/60 R15. FIG. 15 shows the tire 50 in the vulcanization mould; FIG. 16 shows the finished tire 50.

The P6000 205/60 R15 tire has the following composition: tread 51; ply 52 (0° belt) with rayon cords; outer belt 53 with steel cords; inner belt 54 with steel cords; carcass 55 with rayon cords; liner 56; bead filler 57; edge 58 with rayon cords; anti-abrasive 59; sidewall 60.

Figure 17:
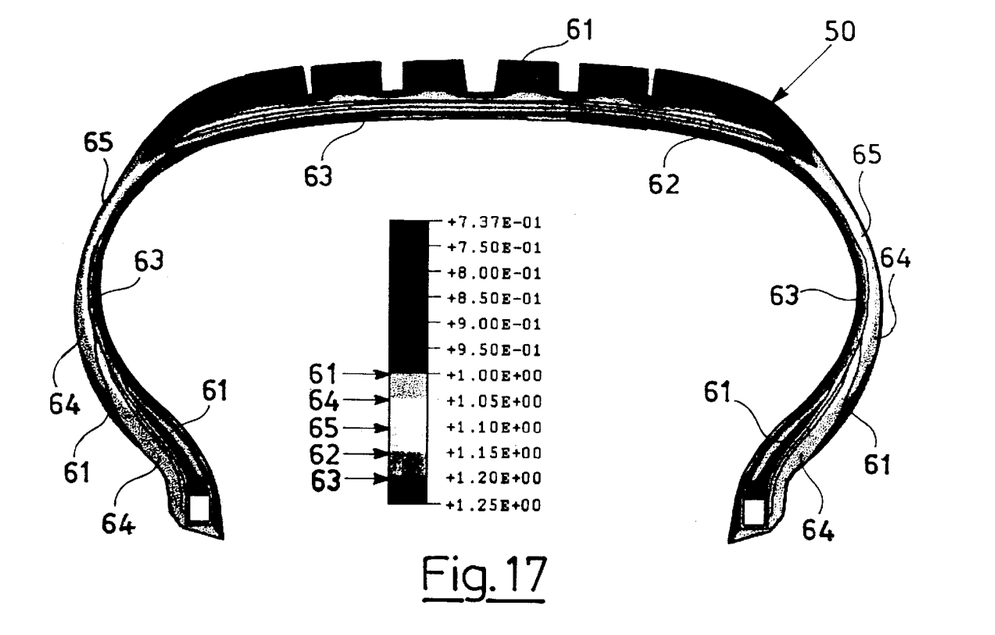
FIGS. 17 and 18 show the level of vulcanization of the tire shown in FIGS. 15 and 16, determined by the method according to the invention.
Figure 18:
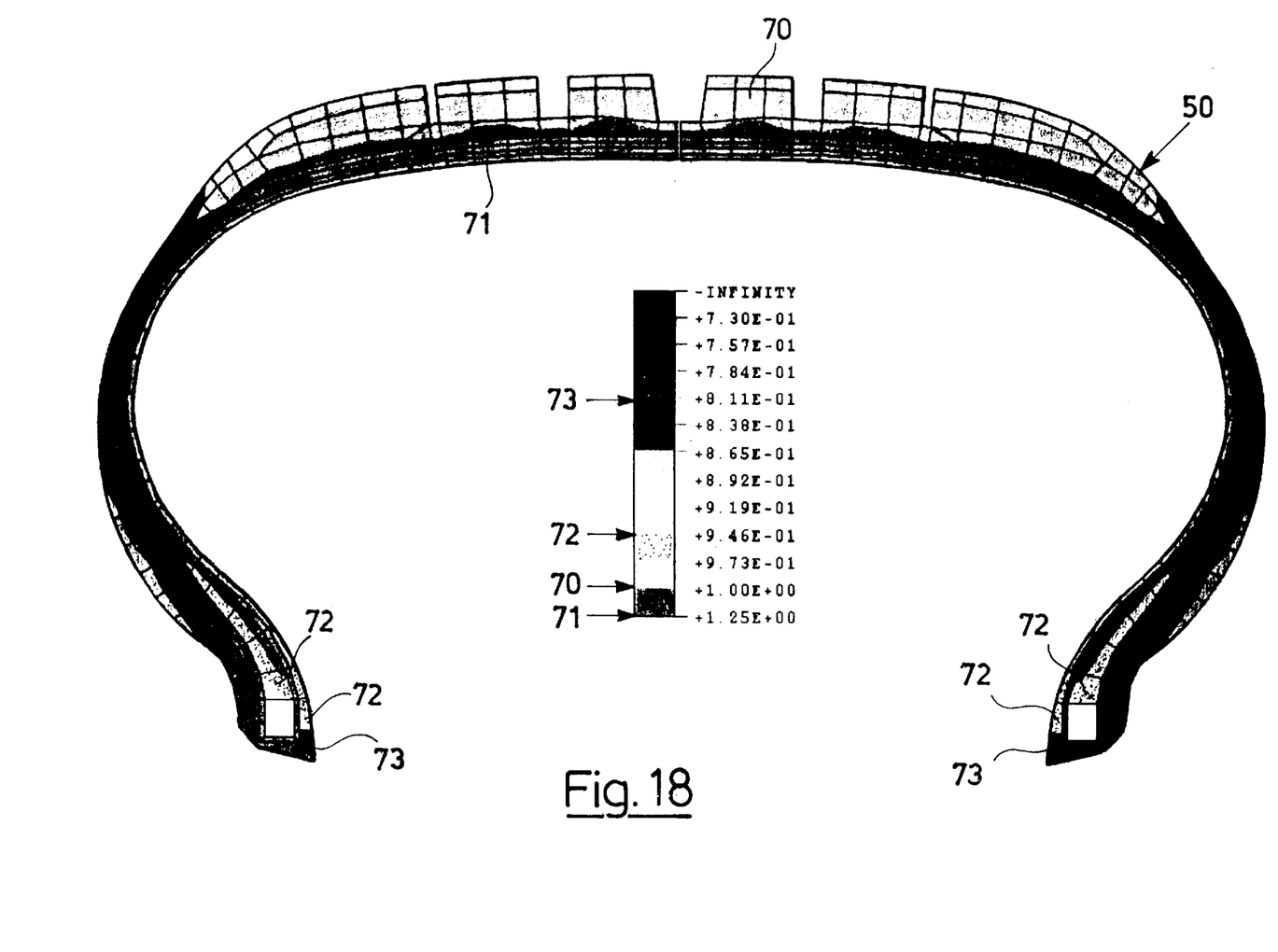

FIG. 17 shows the degree of vulcanization (61–65) of the P6000 205/60 R15 tire obtained with a n.p. vulcanization cycle, optimized by the method according to the invention, and FIG. 18 shows the correctly vulcanized areas (70, 71) and the under-vulcanized areas (73).

The following vulcanization timetable was used.

In the vulcanization chamber:
1. Introduction of saturated steam at 187° C. for 3'45".
2. Superheated water at 203° C. for 9'15".
3. Discharge 1'.

Total 15'.

Mould:
- sectors, steam at 180° C. constant
- cheeks, steam at 160° C. constant.

What is claimed is:

1. Method for vulcanizing a tire by predetermining the change of its state of vulcanization in time by means of a parameter consisting of its degree of vulcanization, the said tire comprising specified vulcanizable mixtures and specified fabrics, the said vulcanization being carried out by means of a vulcanization mould heated by heat-supply fluids and by subjecting the said tire to cooling by means of a specified cooling fluid, the said method comprising the steps of:

a) determining specified structural and dimensional parameters (geometry) of the said tire and the said mould, b) determining the change over a time t of specified thermodynamic parameters, comprising the temperature T(t) and diffusivity α of the said tire, mould, heat-supply fluid and cooling fluid, c) determining a parameter consisting of an equivalent vulcanization time $t_0$ which, at a specified constant reference temperature $T_0$, makes it possible to obtain an equivalent degree of vulcanization $X(t_0)$ equal to the degree of vulcanization $X(t)$ obtained at a specified instant t and at a specified temperature T(t) variable in time, the said equivalent vulcanization time $t_0$ being obtained by means of a specified function of the said reference temperature $T_0$, of the said temperature T(t) and of the said time t, d) determining the said equivalent degree of vulcanization $X(t_0)$ at specified points within the said tire when the said equivalent vulcanization time $t_0$ varies, the said degree of vulcanization $X(t_0)$ being obtained by means of an equivalent isothermal rheometric curve, at the said reference temperature $T_0$, comprising three consecutive sections having the following equations:

$$X(t_o) = \begin{cases} \dfrac{k t_o^n}{1 + k t_o^n} \\ \dfrac{k_x t_o^{n_x}}{1 + k_x t_o^{n_x}} + f(t_o - t_{xx}) \\ 1 - C \dfrac{k_R(t_o - t_{100})^{n_R}}{1 + k_R(t_o - t_{100})^{n_R}} \end{cases}$$

where the aforesaid first equation is valid for a $t_0$ less than or equal to a first specified equivalent time value ($t_0 \leq t_{60}$) at which there is a first specified equivalent degree of vulcanization ($X(t_{60})=60\%$), the aforesaid third equation is valid for a $t_0$ greater than or equal to a second specified equivalent time value ($t_0 \geq t_{100}$) at which there is a second specified value of the equivalent degree of vulcanization ($X(t_{100})=100\%$ or 1), and the aforesaid second equation is valid for a $t_0$ lying between the said first and second values of the said equivalent time ($t_{60} \leq t_0 \leq t_{100}$), where $t_{xx}$ is a third specified equivalent time value, intermediate between the said first ($t_{60}$) and second ($t_{100}$) equivalent time value, at which there is a third specified value of the equivalent degree of vulcanization ($X(t_{xx})=90\%$), where $f(t_0-t_{xx})$ is a cubic interpolation function which, for a $t_0$ less than or equal to the said third equivalent time value ($t_0 \leq t_{xx}$), is equal to 0, while, for a $t_0$ lying between the said third equivalent time value and the said second equivalent time value ($t_{xx} \leq t_0 \leq t_{100}$), it is such that the function $X(t_0)$ passes through an intermediate point consisting of the said intermediate value of the equivalent degree of vulcanization ($X(t_{xx})$) and terminates with a horizontal tangent at a point consisting of the said second value of equivalent degree of vulcanization $X(t_{100})$, where C is equal to $1-X_\infty$, $X_\infty$ being a fourth, asymptotic value of the equivalent degree of vulcanization which is present for the equivalent time value tending towards infinity, and where each pair of the aforesaid parameters (n, k; $n_x$, $k_x$; $n_R$, $k_R$) is determined by setting a corresponding pair of values of equivalent degree of vulcanization ($X_1$, $X_2$), determining the corresponding equivalent vulcanization times ($t_1$, $t_2$) by the procedure described in point c), and obtaining from each of the aforesaid three equations a system of two equations with three unknowns.

2. Method according to claim 1, characterized in that in said step b) the said diffusivity (α) and temperature (T) are determined by means of the following steps:

b1) finite element modelling of the said tire and the said mould by means of a lattice (mesh) formed from specified finite elements and nodes;

b2) assigning initial contour conditions by the association of specified initial temperatures with each of the aforesaid nodes, b3) determining the variation in time of the temperature and convection coefficient of the said fluids for supplying heat to the said mould during the said vulcanization, b4) determining the variation in time of the temperature and convection coefficient of the said cooling fluid during the cooling of the said tire, b5) determining the change in time of the said temperature T(t) at specified points within the said tire and the said mould, by means of the Fourier equation for heat transmission, solved by the finite element method.

3. Method according to claim 1, characterized in that the said specified function by means of which the said equivalent vulcanization time $t_0$ is determined in step c) is expressed as follows:

where T(t) is found in the preceding step b5), and α and β are determined by means of three isothermal rheometric diagrams obtained from test specimens of each mixture at three specified temperatures ($T_A$, $T_B$, $T_C$), each rheometric diagram representing the change of the torque S' and of the corresponding degree of vulcanization ($X_A(t)$; $X_B(t)$; $X_C(t)$) of the said mixture as a function of time, β being found by means of the aforesaid equation using the aforesaid three temperatures ($T_A$, $T_B$, $T_C$) and three time increments ($\Delta t_A$, $\Delta t_B$, $\Delta t_C$) which cause the degree of vulcanization to change from a first specified value $X_{11}$ to a second specified value $X_{21}$ in the aforesaid three rheometric diagrams, and α is found by means of the aforesaid equation using two of the aforesaid temperatures ($T_A$, $T_B$) and two of the said time increments ($\Delta t_A$, $\Delta t_B$) of two of the aforesaid three rheometric diagrams.

4. Method according to claim 1, characterized in that it also comprises the following step:

e) determining a parameter consisting of a torque S' at a specified temperature T, given the aforesaid degree of vulcanization $X(t_0)$, by means of the following function:

$$S'(T, X) = S'_{min}(T) + X^*(S'_{max}(T) - S'_{min}(T))$$

where and where $S'_{min}(T_0)$=minimum torque at the said reference temperature $T_0$; $S'_{max}(T_0)$=maximum torque at the said reference temperature $T_0$; $D_{min}$=derivative of $S'_{min}$ with respect to the said temperature T; $D_{max}$=derivative of $S'_{max}$ with respect to the said temperature T.

5. Method according to claim 1, characterized in that the aforesaid pair of values of the equivalent degree of vulcanization ($X_1$, $X_2$) consists of $X_1=30\%$ and $X_2=60\%$ for the aforesaid first equation.

6. Method according to claim 1, characterized in that the aforesaid pair of values of the equivalent degree of vulcanization ($X_1$, $X_2$) consists of $X_1=60\%$ and $X_2=90\%$ for the aforesaid second equation.

7. Method according to claim 1, characterized in that the aforesaid pair of values of the equivalent degree of vulcanization ($X_1$, $X_2$) consists of $X_1=20\%$ and $X_2=60\%$ for the aforesaid third equation, the reduction of X for t tending towards infinity being set at $X_R=100\%$.

* * * * *

UNITED STATES PATENT AND TRADEMARK OFFICE
CERTIFICATE OF CORRECTION

PATENT NO. : 6,478,991 B1
DATED : November 12, 2002
INVENTOR(S) : Federico Mancosu et al.

It is certified that error appears in the above-identified patent and that said Letters Patent is hereby corrected as shown below:

Column 20,
Line 18, "characterized in that the" should read -- wherein --.
Line 21, after "expressed as follows:", insert $$-- t_0(t) = \int_0^t e^{\alpha \frac{T(t)-T_0}{(T(t) \cdot T_0)^\beta}} dt --.$$

Line 47, after "where", insert $$-- \begin{cases} S'_{min}(T) = S'(T,0) = S'_{min}(T_0) + D_{min}(T-T_0) \\ S'_{max}(T) = S'(T,1) = S'_{max}(T_0) + D_{max}(T-T_0) \end{cases} --.$$

Signed and Sealed this

Twentieth Day of May, 2003

JAMES E. ROGAN
*Director of the United States Patent and Trademark Office*